United States Patent
Roberts et al.

(10) Patent No.: US 7,945,645 B2
(45) Date of Patent: *May 17, 2011

(54) METHOD AND SYSTEM FOR ACCESSING WEB PAGES BASED ON PLAYBACK OF RECORDINGS

(75) Inventors: Dale T. Roberts, San Anselmo, CA (US); Ann E. Greenberg, San Anselmo, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/686,216

(22) Filed: Jan. 12, 2010

(65) Prior Publication Data

US 2010/0106807 A1 Apr. 29, 2010

Related U.S. Application Data

(60) Continuation of application No. 11/841,784, filed on Aug. 20, 2007, now Pat. No. 7,680,902, which is a continuation of application No. 09/820,722, filed on Mar. 30, 2001, now Pat. No. 7,308,485, which is a continuation of application No. 09/354,166, filed on Jul. 16, 1999, now Pat. No. 6,230,192, which is a division of application No. 09/060,876, filed on Apr. 15, 1998, now Pat. No. 6,154,773, which is a continuation-in-part of application No. 08/838,082, filed on Apr. 15, 1997, now Pat. No. 5,987,525.

(51) Int. Cl.
*G06F 13/00* (2006.01)
(52) U.S. Cl. ................. 709/219; 709/206; 709/250
(58) Field of Classification Search .......... 709/204, 709/206, 217, 219, 250
See application file for complete search history.

(56) References Cited

U.S. PATENT DOCUMENTS

| | | |
|---|---|---|
| 4,488,179 A | 12/1984 | Kruger et al. |
| 4,599,644 A | 7/1986 | Fischer |
| 4,641,205 A | 2/1987 | Beyers |
| 4,646,145 A | 2/1987 | Percy et al. |
| 4,675,757 A | 6/1987 | Block |
| 4,870,568 A | 9/1989 | Kahle et al. |
| 5,113,383 A | 5/1992 | Amemiya et al. |
| 5,132,949 A | 7/1992 | Choi |

(Continued)

FOREIGN PATENT DOCUMENTS

EP 0194143 A2 9/1986

(Continued)

OTHER PUBLICATIONS

"U.S. Appl. No. 08/838,082, Non-Final Office Action mailed Sep. 28, 1998", 5 pgs.

(Continued)

*Primary Examiner* — Viet Vu
(74) *Attorney, Agent, or Firm* — Schwegman Lundberg & Woessner, P.A.

(57) ABSTRACT

Entertainment content complementary to a musical recording is delivered to a user's computer by a computer network link. The user employs a browser to access the computer network. A plug-in for the browser is able to control an audio CD or other device for playing the musical recording. A script stored on the remote computer accessed over the network is downloaded. The script synchronizes the delivery of the complementary entertainment content with the play of the musical recording.

31 Claims, 3 Drawing Sheets

U.S. PATENT DOCUMENTS

| | | | |
|---|---|---|---|
| 5,157,614 A | 10/1992 | Kashiwazaki et al. | |
| 5,157,646 A | 10/1992 | Amemiya et al. | |
| 5,206,949 A | 4/1993 | Cochran et al. | |
| 5,210,734 A | 5/1993 | Sakurai | |
| 5,237,157 A | 8/1993 | Kaplan | |
| 5,263,010 A | 11/1993 | Amemiya et al. | |
| 5,341,350 A | 8/1994 | Frank et al. | |
| 5,388,259 A | 2/1995 | Fleischman et al. | |
| 5,392,264 A | 2/1995 | Hira | |
| 5,404,393 A | 4/1995 | Remillard | |
| 5,410,543 A | 4/1995 | Seitz et al. | |
| 5,414,684 A | 5/1995 | Nonaka et al. | |
| 5,430,698 A | 7/1995 | Nonaka et al. | |
| 5,446,714 A | 8/1995 | Yoshio et al. | |
| 5,446,891 A | 8/1995 | Kaplan et al. | |
| 5,450,597 A | 9/1995 | Klappert et al. | |
| 5,463,605 A | 10/1995 | Nishida et al. | |
| 5,464,946 A | 11/1995 | Lewis | |
| 5,465,240 A | 11/1995 | Mankovitz | |
| 5,471,576 A | 11/1995 | Yee | |
| 5,475,835 A | 12/1995 | Hickey | |
| 5,488,725 A | 1/1996 | Turtle et al. | |
| 5,544,139 A | 8/1996 | Aramaki et al. | |
| 5,559,764 A | 9/1996 | Chen et al. | |
| 5,559,949 A | 9/1996 | Reimber et al. | |
| 5,583,560 A | 12/1996 | Florin et al. | |
| 5,584,025 A | 12/1996 | Keithley et al. | |
| 5,615,345 A | 3/1997 | Wanger | |
| 5,625,608 A | 4/1997 | Grewe et al. | |
| 5,642,337 A | 6/1997 | Oskay et al. | |
| 5,649,114 A | 7/1997 | Deaton et al. | |
| 5,659,732 A | 8/1997 | Kirsch | |
| 5,673,322 A | 9/1997 | Pepe et al. | |
| 5,679,911 A | 10/1997 | Moriyama et al. | |
| 5,680,379 A | 10/1997 | Ishida et al. | |
| 5,689,484 A | 11/1997 | Hirasawa | |
| 5,691,964 A | 11/1997 | Niederlein et al. | |
| 5,694,162 A | 12/1997 | Freeny, Jr. | |
| 5,694,546 A | 12/1997 | Reisman | |
| 5,701,385 A | 12/1997 | Katsuyama et al. | |
| 5,703,795 A | 12/1997 | Mankovitz | |
| 5,710,884 A | 1/1998 | Dedrick | |
| 5,721,827 A | 2/1998 | Logan et al. | |
| 5,726,957 A | 3/1998 | Hisamatsu et al. | |
| 5,727,129 A | 3/1998 | Barrett et al. | |
| 5,740,304 A | 4/1998 | Katsuyama et al. | |
| 5,740,549 A | 4/1998 | Reilly et al. | |
| 5,745,681 A | 4/1998 | Levine et al. | |
| 5,751,672 A | 5/1998 | Yankowski | |
| 5,751,956 A | 5/1998 | Kirsch | |
| 5,754,784 A | 5/1998 | Garland et al. | |
| 5,757,739 A | 5/1998 | Heath et al. | |
| 5,761,606 A | 6/1998 | Wolzien | |
| 5,761,649 A | 6/1998 | Hill | |
| 5,768,222 A | 6/1998 | Hisamatsu et al. | |
| 5,774,431 A | 6/1998 | Bos et al. | |
| 5,774,664 A | 6/1998 | Hidary et al. | |
| 5,774,666 A * | 6/1998 | Portuesi | 725/110 |
| 5,778,181 A | 7/1998 | Hidary et al. | |
| 5,778,187 A | 7/1998 | Monteiro et al. | |
| 5,781,889 A | 7/1998 | Martin et al. | |
| 5,781,897 A | 7/1998 | Chen et al. | |
| 5,781,909 A | 7/1998 | Logan et al. | |
| 5,782,692 A | 7/1998 | Stelovsky | |
| 5,793,726 A | 8/1998 | Nagano | |
| 5,793,980 A | 8/1998 | Glaser et al. | |
| 5,796,393 A | 8/1998 | MacNaughton et al. | |
| 5,796,945 A | 8/1998 | Tarabella | |
| 5,796,948 A | 8/1998 | Cohen | |
| 5,796,952 A | 8/1998 | Davis et al. | |
| 5,801,689 A | 9/1998 | Huntsman | |
| 5,809,250 A | 9/1998 | Kisor | |
| 5,809,512 A | 9/1998 | Kato | |
| 5,815,471 A | 9/1998 | Mince et al. | |
| 5,822,216 A | 10/1998 | Satchell, Jr. et al. | |
| 5,822,283 A | 10/1998 | Bos et al. | |
| 5,822,436 A | 10/1998 | Rhoads | |
| 5,835,914 A | 11/1998 | Brim | |
| 5,838,910 A | 11/1998 | Domenikos et al. | |
| 5,848,427 A | 12/1998 | Hyodo | |
| 5,893,910 A | 4/1999 | Martineau et al. | |
| 5,894,554 A | 4/1999 | Lowery et al. | |
| 5,903,816 A | 5/1999 | Broadwin et al. | |
| 5,905,248 A | 5/1999 | Russell | |
| 5,905,865 A | 5/1999 | Palmer et al. | |
| 5,915,091 A | 6/1999 | Ludwig et al. | |
| 5,915,288 A | 6/1999 | Gabriel | |
| 5,918,223 A | 6/1999 | Blum et al. | |
| 5,925,843 A * | 7/1999 | Miller et al. | 84/609 |
| 5,929,849 A | 7/1999 | Kikinis | |
| 5,949,411 A | 9/1999 | Doerr et al. | |
| 5,950,173 A | 9/1999 | Perkowski | |
| 5,953,005 A | 9/1999 | Liu | |
| 5,956,716 A | 9/1999 | Kenner et al. | |
| 5,959,944 A | 9/1999 | Dockes et al. | |
| 5,959,945 A | 9/1999 | Kleiman | |
| 5,963,916 A | 10/1999 | Kaplan | |
| 5,987,454 A | 11/1999 | Hobbs | |
| 5,987,525 A | 11/1999 | Roberts et al. | |
| 5,991,798 A | 11/1999 | Ozaki et al. | |
| 5,995,091 A | 11/1999 | Near et al. | |
| 5,996,000 A | 11/1999 | Shuster | |
| 6,005,565 A | 12/1999 | Legall et al. | |
| 6,009,410 A | 12/1999 | LeMole et al. | |
| 6,011,758 A | 1/2000 | Dockes et al. | |
| 6,018,768 A | 1/2000 | Ullman et al. | |
| 6,025,837 A | 2/2000 | Matthews, III et al. | |
| 6,029,142 A | 2/2000 | Hill | |
| 6,031,795 A | 2/2000 | Wehmeyer | |
| 6,032,130 A | 2/2000 | Alloul | |
| 6,034,925 A * | 3/2000 | Wehmeyer | 369/30.28 |
| 6,061,680 A | 5/2000 | Scherf et al. | |
| 6,112,240 A | 8/2000 | Pogue et al. | |
| 6,128,255 A | 10/2000 | Yankowski | |
| 6,128,625 A | 10/2000 | Yankowski | |
| 6,138,162 A | 10/2000 | Pistriotto et al. | |
| 6,147,940 A | 11/2000 | Yankowski | |
| 6,154,773 A | 11/2000 | Roberts et al. | |
| 6,161,132 A | 12/2000 | Roberts et al. | |
| 6,175,857 B1 | 1/2001 | Hichaya et al. | |
| 6,189,030 B1 | 2/2001 | Dirsch et al. | |
| 6,195,693 B1 | 2/2001 | Berry et al. | |
| 6,226,672 B1 | 5/2001 | DeMartin et al. | |
| 6,230,192 B1 | 5/2001 | Roberts et al. | |
| 6,243,725 B1 | 6/2001 | Hempleman et al. | |
| 6,247,022 B1 | 6/2001 | Yankowski | |
| 6,263,028 B1 | 7/2001 | Nagano | |
| 6,263,505 B1 | 7/2001 | Walker et al. | |
| 6,272,078 B2 | 8/2001 | Yankowski | |
| 6,304,523 B1 | 10/2001 | Jones et al. | |
| 6,314,570 B1 | 11/2001 | Tanigawa et al. | |
| 6,324,694 B1 | 11/2001 | Watts et al. | |
| 6,330,593 B1 | 12/2001 | Roberts et al. | |
| 6,388,957 B2 | 5/2002 | Yankowski | |
| 6,388,958 B1 | 5/2002 | Yankowski | |
| 6,434,597 B1 | 8/2002 | Hachiya et al. | |
| 6,457,076 B1 | 9/2002 | Cheng et al. | |
| 6,496,802 B1 | 12/2002 | Van Zoest et al. | |
| 6,505,160 B1 | 1/2003 | Levy et al. | |
| 6,535,907 B1 | 3/2003 | Hachiya et al. | |
| 6,609,105 B2 | 8/2003 | VanZoest et al. | |
| 6,636,249 B1 | 10/2003 | Rekimoto | |
| 6,671,736 B2 | 12/2003 | Virine et al. | |
| 6,829,368 B2 | 12/2004 | Meyer et al. | |
| 6,850,971 B1 | 2/2005 | Murakoshi et al. | |
| 6,941,275 B1 | 9/2005 | Swierczek | |
| 7,167,857 B2 | 1/2007 | Roberts | |
| 7,302,574 B2 | 11/2007 | Conwell et al. | |
| 7,308,485 B2 | 12/2007 | Roberts et al. | |
| 7,349,552 B2 | 3/2008 | Levy et al. | |
| 7,415,129 B2 | 8/2008 | Rhoads | |
| 7,461,136 B2 | 12/2008 | Rhoads | |
| 7,587,602 B2 | 9/2009 | Rhoads | |
| 7,590,259 B2 | 9/2009 | Levy et al. | |
| 7,680,902 B2 | 3/2010 | Roberts et al. | |
| 2008/0040492 A1 | 2/2008 | Roberts et al. | |
| 2008/0307070 A1 | 12/2008 | Roberts et al. | |

FOREIGN PATENT DOCUMENTS

| | | |
|---|---|---|
| EP | 0460869 A2 | 12/1991 |
| EP | 0319567 B1 | 2/1993 |
| EP | 0814419 A2 | 12/1997 |
| EP | 1197020 B1 | 11/2007 |
| JP | 62189867 A | 8/1987 |
| JP | 05317509 A | 12/1993 |
| JP | 06332483 A | 12/1994 |
| JP | 07093359 A | 4/1995 |
| JP | 07095522 A | 4/1995 |
| JP | 08190527 A | 7/1996 |
| JP | 08194453 A | 7/1996 |
| JP | 08306167 A | 11/1996 |
| JP | 08306170 A | 11/1996 |
| JP | 09007020 A | 1/1997 |
| JP | 09016189 A | 1/1997 |
| JP | 09016476 A | 1/1997 |
| JP | 09081473 A | 3/1997 |
| JP | 10171818 A | 6/1998 |
| WO | WO-9641285 A1 | 12/1996 |
| WO | WO-9705616 A1 | 2/1997 |
| WO | WO-9741504 A1 | 11/1997 |
| WO | WO-9800788 A1 | 1/1998 |
| WO | WO-9802820 A1 | 1/1998 |
| WO | WO-9847080 A2 | 10/1998 |
| WO | WO-9847080 A3 | 10/1998 |
| WO | WO-0128222 A2 | 4/2001 |

OTHER PUBLICATIONS

"U.S. Appl. No. 08/838,082, Notice of Allowance mailed May 25, 1999", 6 pgs.

"U.S. Appl. No. 08/838,082, Response filed Mar. 29, 1999 to Non Final Office Action mailed Sep. 28, 1999", 12 pgs.

"U.S. Appl. No. 08/838,082, Response filed Mar. 29, 1999 to Non-Final Office Action mailed Sep. 28, 1998", 13 pgs.

"U.S. Appl. No. 09/060,876, Final Office Action mailed Mar. 10, 2000", 6 pgs.

"U.S. Appl. No. 09/060,876, Non Final Office Action mailed Oct. 22, 1999", 6 pgs.

"U.S. Appl. No. 09/060,876, Notice of Allowance mailed Jul. 13, 2000", 2 pgs.

"U.S. Appl. No. 09/060,876, Response filed Feb. 22, 2000 to Non Final Office Action mailed Oct. 22, 1999", 10 pgs.

"U.S. Appl. No. 09/060,876, Response filed Jul. 6, 2000 to Final Office Action mailed Mar. 10, 2000", 2 pgs.

"U.S. Appl. No. 09/354,165, Notice of Allowance mailed Dec. 18, 2000", 4 pgs.

"U.S. Appl. No. 09/354,165, Preliminary Amendment mailed Jul. 16, 1999", 4 pgs.

"U.S. Appl. No. 09/354,166, 312 Amendment filed Jan. 9, 2001", 2 pgs.

"U.S. Appl. No. 09/354,166, Advisory Action mailed Jul. 13, 2000", 1 pg.

"U.S. Appl. No. 09/354,166, Final Office Action mailed Mar. 6, 2000", 10 pgs.

"U.S. Appl. No. 09/354,166, Non Final Office Action mailed Sep. 26, 2000", 5 pgs.

"U.S. Appl. No. 09/354,166, Non Final Office Action mailed Oct. 22, 1999", 8 pgs.

"U.S. Appl. No. 09/354,166, Notice of Allowance mailed Dec. 29, 2000", 4 pgs.

"U.S. Appl. No. 09/354,166, Response filed Feb. 22, 2000 to Non Final Office Action mailed Oct. 22, 1999", 25 pgs.

"U.S. Appl. No. 09/354,166, Response filed Jul. 6, 2000 to Non Final Office Action mailed Mar. 6, 2000", 2 pgs.

"U.S. Appl. No. 09/354,166, Response filed Sep. 6, 2000 to Advisory Action mailed Jul. 13, 2000", 4 pgs.

"U.S. Appl. No. 09/354,166, Response filed Dec. 4, 2000 to Non Final Office Action mailed Sep. 26, 2000", 6 pgs.

"U.S. Appl. No. 09/354,166, Supplemental Amendment filed Dec. 18, 2000", 2 pgs.

"U.S. Appl. No. 09/354,167, Notice of Allowance mailed Mar. 14, 2000", 3 pgs.

"U.S. Appl. No. 09/354,167, Preliminary Amendment mailed Jul. 16, 1999", 8 pgs.

"U.S. Appl. No. 09/379,588, Final Office Action mailed Mar. 6, 2000", 8 pgs.

"U.S. Appl. No. 09/379,588, Non-Final Office Action mailed Dec. 13, 1999", 8 pgs.

"U.S. Appl. No. 09/379,588, Notice of Allowance mailed Jul. 13, 2000", 3 pgs.

"U.S. Appl. No. 09/379,588, Preliminary Amendment mailed Aug. 24, 1999", 14 pgs.

"U.S. Appl. No. 09/379,588, Response filed Feb. 22, 2000 to Non-Final Office Action mailed Dec. 13, 1999", 12 pgs.

"U.S. Appl. No. 09/379,588, Response filed Jul. 6, 2000 to Final Office Action mailed Mar. 6, 2000", 2 pgs.

"U.S. Appl. No. 09/379,589, Final Office Action mailed Apr. 4, 2000", 9 pgs.

"U.S. Appl. No. 09/379,589, Final Office Action mailed May 4, 2001", 8 pgs.

"U.S. Appl. No. 09/379,589, Non-Final Office Action mailed Oct. 20, 2000", 6 pgs.

"U.S. Appl. No. 09/379,589, Non-Final Office Action mailed Dec. 13, 1999", 6 pgs.

"U.S. Appl. No. 09/379,589, Notice of Allowance mailed Aug. 17, 2001", 3 pgs.

"U.S. Appl. No. 09/379,589, Preliminary Amendment filed Oct. 4, 2000", 16 pgs.

"U.S. Appl. No. 09/379,589, Preliminary Amendment mailed Aug. 24, 1999", 12 pgs.

"U.S. Appl. No. 09/379,589, Response filed Feb. 23, 2000 to Non-Final Office Action mailed Dec. 13, 1999", 10 pgs.

"U.S. Appl. No. 09/379,589, Response filed Mar. 20, 2001 to Non-Final Office Action mailed Oct. 20, 2000", 10 pgs.

"U.S. Appl. No. 09/379,589, Response filed Aug. 6, 2001 to Final Office Action mailed May 4, 2001", 10 pgs.

"U.S. Appl. No. 09/379,589, Response filed Oct. 4, 2000 to Final Office Action mailed Apr. 4, 2000", 16 pgs.

"U.S. Appl. No. 09/820,722, Advisory Action mailed Jan. 27, 2006", 2 pgs.

"U.S. Appl. No. 09/820,722, Final Office Action mailed Jun. 23, 2005", 9 pgs.

"U.S. Appl. No. 09/820,722, Non-Final Office Action mailed May 3, 2007", 8 pgs.

"U.S. Appl. No. 09/820,722, Non-Final Office Action mailed Aug. 2, 2006", 9 pgs.

"U.S. Appl. No. 09/820,722, Non-Final Office Action mailed Oct. 21, 2004", 6 pgs.

"U.S. Appl. No. 09/820,722, Non-Final Office Action mailed Dec. 24, 2003", 8 pgs.

"U.S. Appl. No. 09/820,722, Notice of Allowance mailed Jan. 12, 2007", 4 pgs.

"U.S. Appl. No. 09/820,722, Preliminary Amendment mailed Mar. 30, 2001", 14 pgs.

"U.S. Appl. No. 09/820,722, Response filed Apr. 25, 2005 to Non-Final Office Action mailed Oct. 21, 2004", 15 pgs.

"U.S. Appl. No. 09/820,722, Response filed May 24, 2004 to Non Final Office Action mailed Dec. 24, 2003", 16 pgs.

"U.S. Appl. No. 09/820,722, Response filed Aug. 2, 2007 to Non-Final Office Action mailed May 3, 2007", 13 pgs.

"U.S. Appl. No. 09/820,722, Response filed Dec. 4, 2006 to Non-Final Office Action mailed Aug. 2, 2006", 18 pgs.

"U.S. Appl. No. 09/820,722, Response filed Dec. 23, 2005 to Final Office Action mailed Jun. 23, 2005", 25 pgs.

"U.S. Appl. No. 09/820,722, Supplemental Notice of Allowability mailed Sep. 20, 2007", 8 pgs.

"U.S. Appl. No. 10/281,948, Non-Final Office Action mailed May 17, 2005", 9 pgs.

"U.S. Appl. No. 10/281,948, Notice of Allowance mailed Feb. 9, 2006", 7 pgs.

"U.S. Appl. No. 10/281,948, Notice of Allowance mailed Aug. 21, 2006", 7 pgs.

"U.S. Appl. No. 10/281,948, Response filed Oct. 19, 2005 to Non-Final Office Action mailed May 17, 2005", 12 pgs.

"U.S. Appl. No. 11/841,784, Non-Final Office Action mailed Jan. 26, 2009", 11 pgs.

"U.S. Appl. No. 11/841,784, Notice of Allowance mailed Jan. 20, 2010", 4 pgs.

"U.S. Appl. No. 11/841,784, Notice of Allowance Mailed Oct. 8, 2009", 7 pgs.

"U.S. Appl. No. 11/841,784, Preliminary Amendment filed Aug. 20, 2007", 17 pgs.

"U.S. Appl. No. 11/841,784, Response filed Jun. 25, 2009 to Non Final Office Action mailed Jan. 26, 2009", 12 pgs.

"U.S. Appl. No. 12/191,625, Non-Final Office Action mailed Mar. 23, 2010", 7.

"BookWhere for Windows Help v2.0", Sea Change Corporation, (1996), 16 pgs.

"BookWhere for Windows User Guide", Software Version 2.0—Manual Version 2.0.4, Sea Change Corporation, (Sep. 11, 1996), 1-36.

"BookWhere for Windows v. 2.1—README", Sea Change Corporation, (1996), 7 pgs.

"Bookwhere for Windows v.1.1—README", Sea Change Corporation, (1995), 2 pgs.

"CNET: The Computer Network Unveils Revolutionary Internet Advertising Tools that Allow Custom Banner Ad Delivery Based on Demographic Information", Press Releases, [Online]. Retrieved from the Internet: <URL: http://www.cnet.com/html/aboutcnet/press/1994_95/120695.html>, (Dec. 6, 1995), 4 pgs.

"European Application Serial No. 03006164.2, European Office Action mailed Nov. 16, 2004", 5 pgs.

"European Application Serial No. 03006164.2, European Office Action mailed Dec. 14, 2005", 5 pgs.

"European Application Serial No. 03006164.2, European Search Report mailed Jun. 25, 2003", 3 pgs.

"European Application Serial No. 03006164.2, Office Action mailed Jul. 2, 2008", 4 pgs.

"Frequently Asked Questions, Troubleshooting ConnecteD", [Online]. Retrieved from the Internet: <URL: jenniferlopez.com/ConnectedD/faq.html>, (Printed Mar. 10, 2005), 5 pgs.

"GeoPac Management Guide", Release 1.25, Geac Computer Corporation Limited, (Dec. 1994), 50 pgs.

"Information retrieval: Application Service Definition and Protocol Specification", ANSI/NISO Z39.50-1995, (Jul. 1995), pp. i-vi & 1-156.

"International Application Serial No. PCT/US98/07660, International Search Report mailed Nov. 26, 1998", 3 pgs.

"Internet Hizakurige Route 24", ASCII vol. 21 No. 4, (Apr. 1, 1997), 464-465.

"Japanese Application Serial No. 10-544286, Japanese Office Action mailed Jan. 15, 2008", 6 pgs.

"Japanese Application Serial No. 10-544286, Office Action mailed May 29, 2007", 10 pgs.

"Japanese Application Serial No. 10-544286, Office Action mailed Sep. 30, 2008", 7 pgs.

"Japanese Application Serial No. 2007-100966, Office Action mailed Feb. 5, 2008", 11 pgs.

"Japanese Application Serial No. 2007-100966, Office Action mailed May 29, 2007", 8 pgs.

"Japanese Application Serial No. 2007-100966, Office Action mailed Jun. 24, 2008", 11 pgs.

"Japanese Application Serial No. 2007-100966, Office Action mailed on Feb. 24, 2009", 7 pgs.

"Japanese Application Serial No. 2007-59701, Notice of Allowance mailed Jun. 2, 2009", 4 pgs.

"Japanese Application Serial No. 2007-59701, Office Action mailed Jan. 15, 2008", 7 pgs.

"Japanese Application Serial No. 2007-59701, Office Action mailed Jun. 5, 2007", 10 pgs.

"Japanese Application Serial No. 2007-59701, Office Action mailed on Sep. 30, 2008", 7 pgs.

"Japanese Application Serial No. 2007-74805, Office Action mailed Jan. 22, 2008", 3 pgs.

"Japanese Application Serial No. 2007-74805, Office Action mailed May 19, 2009", 8 pgs.

"Online Systems: Sound Recordings Format", Second Edition, OCLC Online Computer Library Center, Dublin Ohio, (1986), 1-318.

"Proposal No. 95-1: Changes to Field 856 (Electronic Location and Access) in the USMARC Bibliographic Format", Library of Congress; Federal Geographic Data Committee, [Online]. Retrieved from the Internet: <URL: http://www.loc.gov/marc/marbi/1995/95-01.html>, (Dec. 2, 1994), 13 pgs.

"Proposal No. 95-8: Define Field 856 (Electronic Location and Access) in the USMARC Classification Format", Library of Congress, [Online]. Retrieved from the Internet: <URL: http://www.loc.gov/marc/marbi/1995/95-08.html>, (May 5, 1995), 2 pgs.

"Proposal No. 96-1: Changes to Field 856 (Electronic Location and Access) in the USMARC Formats", Library of Congress, [Online]. Retrieved from the Internet: <URL: http://www.loc.gov/marc/marbi/1996/96-01.html>, (Dec. 1, 1995), 12 pgs.

"Proposal No. 97-9: Renaming of subfield 856$u to accommodate URNs", National Digital Library Program, [Online]. Retrieved from the Internet: <URL: http://www.loc.gov/marc/marbi/1997/97-09.html>, (May 1, 1997), 6 pgs.

"Protocol Specification for Internet Protocol—RFC 791", DARPA Internet Program, (Sep. 1981), pp. i-iii, 1-45.

"PURL Frequently Asked Questions", [Online]. Retrieved from the Internet: <URL: http://purl.oclc.org/docs/purl_faq.html>, (Mar. 20, 1996), 19 sheets.

"Record for DISCID af0f630c", from xmcd 1.4 CD database file.

"Table of Contents of the Proceedings of the 1994 ACM European Conference on Hypermedia Technology", Printed from The ACM Digital Library, (1994), 4 pgs.

"Table of Contents of the Proceedings of the ACM Conference on Hypertext", Printed from The ACM Digital Library, (1992), 4 pgs.

"Table of Contents of the Proceedings of the Fifth ACM Conference on Hypertext", Printed from The ACM Digital Library, (1993), 4 pgs.

"Table of Contents of the Proceedings of the First ACM International Conference on Multimedia", Printed from The ACM Digital Library, (1993), 6 pgs.

"Table of Contents of the Proceedings of the Fourth ACM International Conference on Multimedia", from the ACM Digital Library, (1996), 7 pgs.

"Table of Contents of the Proceedings of the Second ACM International Conference on Multimedia", from the ACM Digital Library, (1994), 10 pgs.

"Table of Contents of the Proceedings of the Second Annual ACM Conference on Hypertext", Printed from The ACM Digital Library, (1989), 4 pgs.

"Table of Contents of the Proceedings of the Seventh ACM Conference on Hypertext", Printed from The ACM Digital Library, (1996), 4 pgs.

"Table of Contents of the Proceedings of the Third ACM International Conference on Multimedia", from The ACM Digital Library, (1995), 8 pgs.

"Table of Contents of the Proceedings of the Third Annual ACM Conference on Hypertext", Printed from The ACM Digital Library, (1991), 5 pgs.

"USMARC Format for Bibliographic Data—Update 2", Prepared by Network Development & MARC Standards Office, Cataloging Distribution Service, Library of Congress, (Mar. 1996), 578 pgs.

"USMARC Format for Bibliographic Data, Including Guidelines for Content Designation", Prepared by Network Development & MARC Standards Office, Cataloging Distribution Service, Library of Congress, (1994), 547 pgs.

"Win32 Programmer's Reference vol. 2: System Services, Multimedia Extensions and Application Notes", Microsoft Press, (1993), 517-519, 521-672.

"Workman Changes", Release 1.3, (1994), 5 pgs.

"ZIG Meeting Minutes", for Sep. 1995, 1-22.

Akscyn, Robert M., et al., "Design of hypermedia script languages: the KMS experience", Proceedings of the Fifth ACM Conference on Hypertext, (1993), 268-269.

Baugher, Mark, et al., "A multimedia client to the IBM LAN server", Proceedings of the first ACM International Conference on Multimedia, (1993), 105-112.

Berners-Lee, T., et al., "", Hypertext Transfer Protocol—HTTP 1.0, Network Working Group, (May 1996), 61 pgs.

Berners-Lee, Tim, et al., "Weaving the Web", (1999), 188, 189, 211-219.

Caruso, Denise, "CD-I Has a Rough Row to Hoe", Digital Media, printed on Mar. 10, 2005 from www.Caruso.com/Digital_Media/DM91-07.TXT, (Jul. 1991), 1-13.

Chua, T. S., et al., "Content-based retrieval of segmented images", Proceedings of the Second ACM International Conference on Multimedia, (1994), 211-218.

Comer, Douglas E., et al., "", Internetworking with TCP/IP, vol. 2, Design, implementation, and internals, ANSI C Version, 3rd Edition, Upper Saddle River, NJ: Prentice Hall, (1999), 1-660.

Comer, Douglas E., et al., "", Internetworking with TCP/IP, vol. 3, Client-server programming and applications, BSD Socket Version, Upper Saddle River, NJ: Prentice Hall, (1993), 1-498.

Comer, Douglas, et al., "Chapter 4—Internet Addresses & Chapter 5—Mapping Internet Addresses to Physical Addresses (ARP)", Internetworking with TCP/IP, vol. 1, Upper Saddle River, N.J. : Prentice Hall, (1995), 59-88, 588.

Courtiat, J. P., et al., "Towards a new multimedia synchronization mechanism and its formal definition", Proceedings of the Second ACM International Conference on Multimedia, (1994), 133-140.

Deep, John, et al., "", Developing CGI applications with Perl, New York : Wiley Computer Pub., (1996), 72-77.

Deroure, David, et al., "A Multiagent system for Content Based Navigation of Music", Proceedings of the Seventh ACM International Conference on Multimedia, (1999), 63-68.

Ghandeharizadeh, S., et al., "On multimedia repositories, personal computers, and hierarchical storage systems", Proceedings of the Second ACM International Conference on Multimedia, (1994), 407-416.

Graham, Ian S., "The HTML Sourcebook", John Wiley & Sons, (1995).

Harada, M., "Cooperative Service of WWW and CD from Disk-Based to Server-Based", Nikkei Electronics. vol. 679, (Jan. 6, 1997), 13-14.

Hertzfeld, Andy, "User interface and artistic values", Stanford University Program in Human-Computer Interaction, [Online]. Retrieved from the Internet: <URL: http://hci.stanford.edu/cs547/abstracts/91-92/920415-hertzfeld.html>, (Apr. 15, 1992).

Hirata, K., et al., "Media-based navigation for hypermedia systems", Proceedings of the Fifth ACM Conference on Hypertext, (1993), 159-173.

Hiroshige, G., "Microsoft Announces 'PC98' in April Presentation of Annual PC Spec for the Coming Year at Winhec", DOS/V Power Report, 7(4), (Apr. 1, 1997), 227.

Ido, S, "Multimedia Research Forefront-5", Business Communications. 34,(3), (Mar. 1, 1997), 3 pgs.

Kan, Ti, "", XMCD Version 2.0 patchlevel 0, BSD News Article 64976, (Apr. 3, 1996), 10 pgs.

Kan, Ti, "", XMCD Unix CD Player, (Mar. 21, 1996), 1358 pgs.

Lenk, John D., "", Lenk's laser handbook : featuring CD, CCV, and CD-ROM technology, New York : McGraw-Hill, (1992), 2.1-2.13.

Lewis, P. H., et al., "Content based navigation in multimedia information systems", Proceedings of the Fourth ACM International Conference on Multimedia, (1996), 415-416.

Lewis, Paul H., et al., "Media-based Navigation with Generic Links", Proceedings of the the Seventh ACM Conference on Hypertext, (1996), 215-223.

Li, L., et al., "MPEG-2 coded- and uncoded-stream synchronization control for real-time multimedia transmission and presentation over B-ISDN", Proceedings of the Second ACM International Conference on Multimedia, (1994), 239-246.

Lienhart, R., "Automatic text recognition for video indexing", Proceedings of the Fourth ACM International Conference on Multimedia, (1997), 11-20.

Little, T. D.C., et al., "A digital on-demand video service supporting content-based queries", Proceedings of the First ACM International Conference on Multimedia, (1993), 427-436.

Mascha, M., et al., "Interactive education: Transitioning CD-ROMs to the Web", Computer Networks and ISDN Systems, 27(2), (Nov. 1994), 267-272.

Mayer-Patel, Ketan, et al., "Synchronized continuous media playback through the World Wide Web", Proceedings of the Fourth ACM International Conference on Multimedia, (1997), 435-436.

Oikarinen, J., et al., "Internet Relay Chat Protocol", RFC 1459, Network Working Group, (May 1993).

Petkovic, Dragutin, et al., "Multimedia Databases and Information Systems", Proceedings of the Second ACM International Conference on Multimedia, (1994), p. 67.

Prabhakaran, B., et al., "Synchronization models for multimedia presentation with user participation", Proceedings of the First ACM International Conference on Multimedia, (1993), 157-166.

Qazi, Naveed U., et al., "A synchronization and communication model for distributed multimedia objects", Proceedings of the First ACM International Conference on Multimedia, (1993), 9 pgs.

Roscheisen, M., et al., "Beyond Browsing: Shared Comments, SOAPs, Trails and On-Line Communities", Computer Networks and ISDN Systems, 27(6), North Holland Publishing, (Apr. 1995), 739-749.

Scherf, Steve, "", cddbd—CD Database Protocol Server, Moondog Software Productions, (1996), 48 sheets.

Seltzer, Richard, "The AltaVista Search Revolution", Osborne McGraw-Hill, (1997), 7, 8; 215-37.

Shafer, Keith, et al., "Introduction to Persistent Uniform Resource Locators", OCLC Online Computer Library Center, Inc., [Online]. Retrieved from the Internet: <URL:http://purl.oclc.org/docs/inet96.html>, (1996), 8 pgs.

Shibata, Y., et al., "Dynamic hypertext and knowledge agent systems for multimedia information networks", Proceedings of the Fifth ACM Conference on Hypertext, (1993), 82-93.

Smith, Brian C., et al., "The Berkeley continuous media toolkit", Proceedings of the Fourth ACM International Conference on Multimedia, (1997), 451-452.

Tompa, F. W., et al., "Hypertext by link-resolving components", Proceedings of the Fifth ACM Conference on Hypertext, (1993), 118-130.

Troll, Denise, "", Z39.50 Implementors Group Meeting Minutes, ftp://lcweb.loc.gov/pub/z3950/minutes/9504.txt, (Apr. 25, 1995), 29 pgs.

Weitzman, L., et al., "Automatic presentation of multimedia documents using relational grammars", Proceedings of the Second ACM International Conference on Multimedia, (1994), 443-451.

Zhang, H., et al., "Video Parsing, Retrieval and Browsing: An Integrated and Content-Based Solution", Proceedings of ACM Multimedia '95, San Francisco, CA, (Nov. 5-9, 1995), 15-24.

* cited by examiner

METHOD AND SYSTEM FOR ACCESSING WEB PAGES BASED ON PLAYBACK OF RECORDINGS

CROSS REFERENCE TO RELATED APPLICATIONS

This is a continuation of U.S. patent application Ser. No. 11/841,784, filed Aug. 20, 2007, which is a continuation of U.S. patent application Ser. No. 09/820,722, filed Mar. 30, 2001, now U.S. Pat. No. 7,308,485, which is a continuation of U.S. patent application Ser. No. 09/354,166, filed Jul. 16, 1999, now U.S. Pat. No. 6,230,192, which is a divisional of U.S. patent application Ser. No. 09/060,876 filed Apr. 15, 1998, now U.S. Pat. No. 6,154,773, which is a continuation-in-part of U.S. patent application Ser. No. 08/838,082, filed Apr. 15, 1997, now U.S. Pat. No. 5,987,525, all of which are hereby incorporated herein by reference in their entirety.

BACKGROUND

Described below are methods and systems relating to the field of computer networking, and more particularly to the use of network protocols to provide services to users which are related to audio recordings.

Over the past few years, on-line services have experienced explosive growth and have become a major new form of entertainment. Alongside this new entertainment, more traditional forms such as musical recordings have continued to be consumed on a massive scale.

The traditional experience of the musical recording is listening by a small group of persons gathered together in a room. The music fills the room acoustically, but there is little associated visual content, and there is only a limited interaction with the recording, consisting essentially of deciding which tracks to play and performing simple transformations on the recorded sound, such as setting the volume or applying an audio equalizer. This traditional experience dates back to the early age of 78 r.p.m. musical recordings almost a century ago.

The traditional production of a musical recording complements the traditional experience of the recording. The recording is produced in a number of recording sessions, subject to careful mixing and editing, and then released to the public. At that point, the recording is in a fixed form, nowadays an audio CD, whose purpose is to record as faithfully as possible the final sonic experience designed by its authors, the musicians, producer, and recording engineers.

Music videos have supplemented the traditional experience of musical recordings by allowing the association of visual content with tracks of such a recording. In practice, however, music videos have been broadcast, with all the problems of lack of user control which that implies, and they have not contributed to interactivity or participation by the consumer.

On-line services offer opportunities for enriching the experience associated with musical recordings. The present invention is addressed to computer programs, systems, and protocols which can fulfill this promise.

SUMMARY

An aspect is to provide computer programs, systems, and protocols which allow producers to deliver entertainment complementary to musical recordings by on-line services such as the Internet. It is a further aspect to provide computer programs, systems, and protocols which allow such complementary entertainment to be meaningfully interactive for the consumer, such that the consumer can also be a creator of the experience.

Another aspect is to achieve the foregoing by implementations designed to attain integration with existing environments and programs, particularly on the Internet, while retaining the flexibility to adapt to the continuing evolution of standards for on-line services.

In one of the aspects, software is provided which permits a computer program running on a remote host to control a compact disc (CD) player, DVD player, or the like on a user's computer. (For convenience; we use the term "CD player" to refer also to DVD players and similar devices.) The software is designed to permit the remote host both to initiate actions on the CD player and to become aware of actions which the user has initiated by other controls, such as the buttons on the CD player's front panel or a different CD player control program. This aspect is a building-block for the provision of complementary entertainment for musical recordings when those recordings are fixed in the prevailing contemporary form, the audio CD.

In a second aspect, visual content, including interactive content, may be delivered over an on-line service in such a way that it is synchronized to the delivery of content from a musical recording. Such visual content may, for example, be synchronized to the playing of an audio CD in the user's computer. The visual content is thematically linked to the musical recording, for example in the manner of a music video.

In a third aspect, a method is provided for assigning a unique identifier to musical recordings consisting of a number of tracks. A unique identifier is a useful complement to the delivery of visual content in conjunction with the playing of an audio CD in that it allows the software which delivers the visual content to be sure that the audio CD is in fact the correct CD to which the visual content corresponds. If the visual content is designed, for example, to accompany the Rosary Sonatas of Heinrich Ignaz Franz Biber, it would presumably not function well if the CD in the user's player were the soundtrack for the film Mary Poppins. The unique identifier also allows a CD to be used as a key to access a premium Web area. Furthermore, the unique identifier can allow the user to be directed to an area of the Web corresponding to the CD which is in the user's machine.

In a fourth aspect, the immensely popular on-line service generally referred to as a "chat room" may be enhanced by a link to a musical recording to which all persons in the room are listening. The chat room experience as it exists today in on-line services has a disembodied quality by comparison with traditional face-to-face social encounters, in which there are identifiable surroundings. The only common experience to the chat users today are the words of the chat as they fly by on a computer screen, and perhaps the user icons ("avatars") or other visual content occupying a small space on the screen. The use of a musical recording in conjunction with a chat room opens up the possibility of restoring to the experience a degree of the shared ambience of traditional social encounters. Furthermore, the musical recording offers a focal point that allows chat-seekers to group together by shared interests in a particular type of recording.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
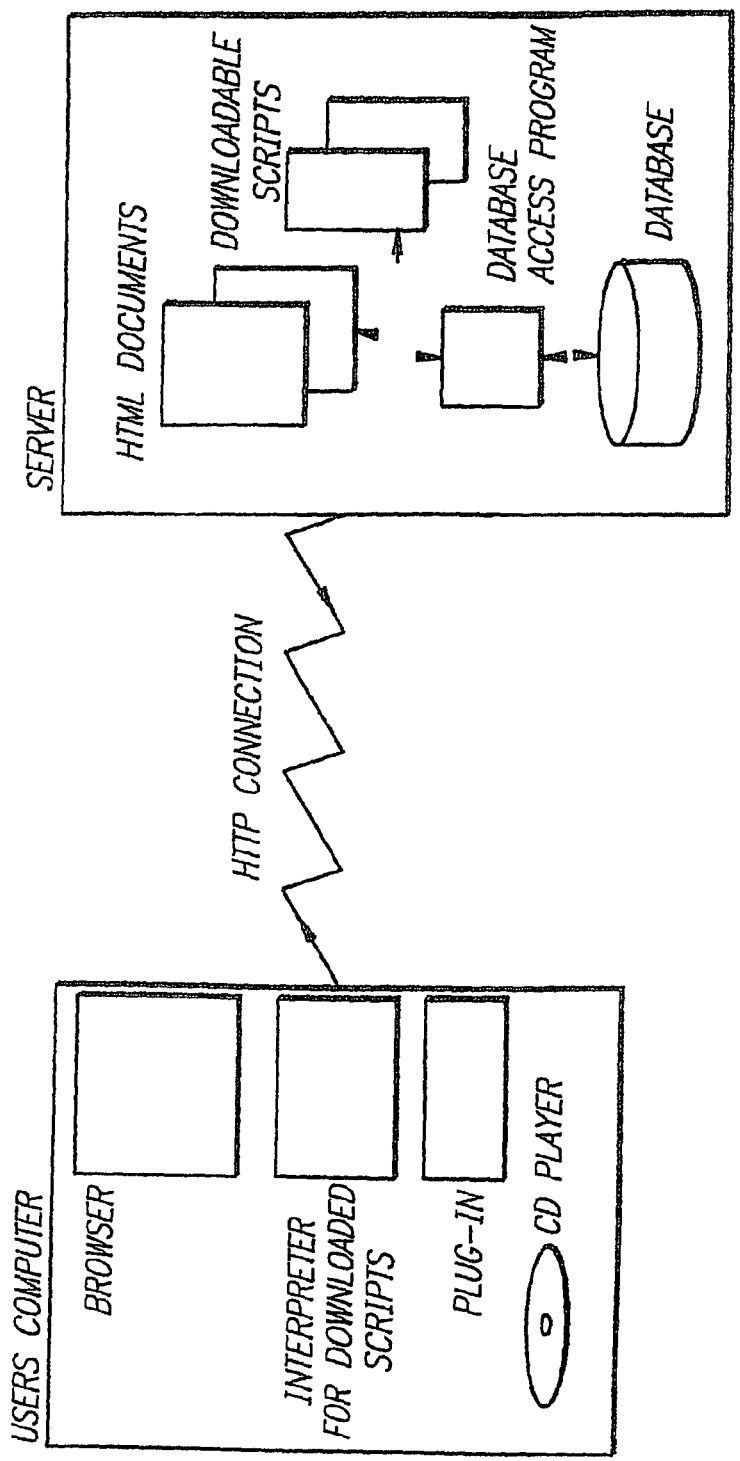
FIG. 1 is a block diagram of the environment in which the preferred embodiment operates.

Reference will now be made in detail to the preferred embodiments, examples of which are illustrated in the accompanying drawings, wherein like reference numerals refer to like elements throughout.

1. Introduction

The preferred embodiment operates on the World Wide Web. The software implementation environment provided by the World Wide Web is described in a number of books, for example, John December & Mark Ginsburg, HTML 3.2 and CGI Unleashed (1996). The World Wide Web is based on a network protocol called HTTP (hypertext transfer protocol), which is described in T. Berners-Lee et al., Hypertext Transfer Protocol—HYTP/1.0 (Internet Request for Comments No. 1945, 1996). The HTTP protocol must be run atop a general connection-oriented protocol, which today is generally TCP/IP, described in Douglas E. Comer, Internetworking with TCP/IP (3d ed. 1995). However, the method and system described here are not limited to HTTP running over any particular kind of network software or hardware. The principles apply to other protocols for access to remote information that may come to compete with or supplant HTTP.

As shown in FIG. 1, a Web user sits at his or her computer and runs a computer program called a browser. The browser sends out HTTP requests to other computers, referred to as servers. In requests, particular items of data, referred to as resources, which are available on servers, are referred to by uniform resource locators (URL's), character strings in a particular format defined in Berners-Lee et al., supra. A URL includes both an identification of the server and an identification of a particular item of data within the server. Reacting to the requests, the servers return responses to the user's browser, and the browser acts upon those responses, generally by displaying some sort of content to the user.

The content portion of the responses can be a "Web page," expressed in the hypertext markup language (HTML). That language allows one to express content consisting of text interspersed with bitmap-format images and links (also known as anchors and hyperlinks). The links are further URL's to which the browser may, at the users prompting, send further requests.

The responses can also include more complex commands to be interpreted by the browser, e.g., commands which result in an animation. HTML itself does not define complex commands, but rather they are considered to belong to separately-defined scripting languages, of which the two most common ones are JavaScript and VBScript.

In addition to extending the function of the browser by code written in a scripting language, it is also possible to extend the function of a browser with compiled code. Such compiled code is referred to as a "plug-in." The precise protocol for writing a plug-in is dependent on the particular browser. Plug-ins for the Microsoft browser are referred to by the name of ActiveX controls.

Plug-ins may be very complex. A plug-in which may advantageously be used is Shockwave from Macromedia. It permits animations which are part of a server response to be downloaded and played to the user. Shockwave defines its own scripting language called Lingo. Lingo scripts are contained within the downloadable animations which the Shockwave plug-in can play. The general format of a Shockwave animation is a timeline consisting of a series of frames, together with a number of visual objects which appear, perform motions, and disappear at particular frames within the timeline. To achieve more complex effects within a Shockwave animation, Lingo scripts may be invoked in addition to predefined visual objects.

2. Command Plug-In

A preferred embodiment employs a plug-in, referred to as the command plug-in, which provides to a scripting language the ability to command in a detailed fashion the playing of a musical recording. The command plug-in should provide, at a minimum, the following basic functions:

(1) Start and stop play.
(2) Get current track and position within the track.
(3) Seek to a track and a position within the track.
(4) Get and set volume.
(5) Get information regarding the CD (e.g., the number of tracks, their lengths, the pauses between tracks).
(6) Get information regarding the capabilities of the CD drive.

Other functions may be provided, limited only by what the underlying operating system services are able to provide.

The command plug-in is preferably written in a conventional programming language such as C++. The plug-in must conform to the existing standards for plug-ins, such as those required of Microsoft ActiveX objects. In order to obtain the information and carry out the functions which the command plug-in makes available to the scripting language, the command plug-in relies on functions which provide control and information regarding the playing musical recording. These functions will depend on the precise source of the recording. If, as in the currently preferred embodiment, the recording is being played on an audio CD in the computer CD player, and if the browser is running under Microsoft Windows 3.1 or Windows 95, these functions would be the MCI functions, which form a part of the Win32 application programming interface. These functions are documented, for example, in Microsoft Win32 Programmer's Reference. Different functions may be provided by streaming audio receivers, as for example receivers which capture audio which is coming into the user's computer over a network connection in a suitable audio encoding format such as MPEG.

An important point to note about the implementation of the command plug-in is that the operations which it carries out, as for example seeks, may take times on the order of a second. It is undesirable for the command-plug in to retain control of the machine during that interval, so it is important that the plug-in relinquish control of the machine to the browser whenever a lengthy operation is undertaken, and report on the results of the operation via the asynchronous event handling capability used in the common scripting languages.

Given the above summary of the functions which the command plug-in provides, a general knowledge of how to write plug-ins (e.g., of how to writeActiveX objects), and a knowledge of the relevant application programming interface for controlling the play of the musical recording (e.g., MCI in Win32), a person skilled in the art could readily and without undue experimentation develop an actual working command plug-in. For this reason, further details of how the command plug-in is implemented are not provided here.

3. Synchronization

The existence of a command plug-in providing the functions listed above to a scripting language is a foundation on which entertainment complementary to a musical recording may be constructed. In particular, it is possible to devise, building on this foundation, a method for synchronizing the display of visual content by the scripting language with the events which are occurring on the audio CD.

In a preferred embodiment, the synchronization of the visual content to the audio CD proceeds as follows. The visual content is provided by a Shockwave animation, which is downloaded from the server and displayed for the user by a Shockwave plug-in. This downloading may take place before the animation is displayed, or alternatively it may take place as the animation is being displayed, provided the user's connection to the network is fast enough to support download at an appropriate speed. The downloading is a function provided by the Shockwave plug-in itself.

As the Shockwave animation is played, a Lingo script executes each time a frame finishes displaying. The Lingo script contains a description of the relationship which should exist between frames of the animation and segments of the musical recording, identified by track number and by time. The Lingo script determines, by using the command plug-in described above, at which track and time the play of the audio CD is. It then refers to the description in order to determine which frames of the animation correspond to that portion of the audio CD. If the current frame is not one of those frames, the Lingo script resets the time line of the animation so that the animation will begin to play at the frame which corresponds to the current position of the audio CD. This permits the visual content to catch up if it ever lags the CD, for example because downloading from the network has fallen behind, because the user's computer lacks the cycles to play the animation at full speed or because the user has fast forwarded the CD.

Figure 2:
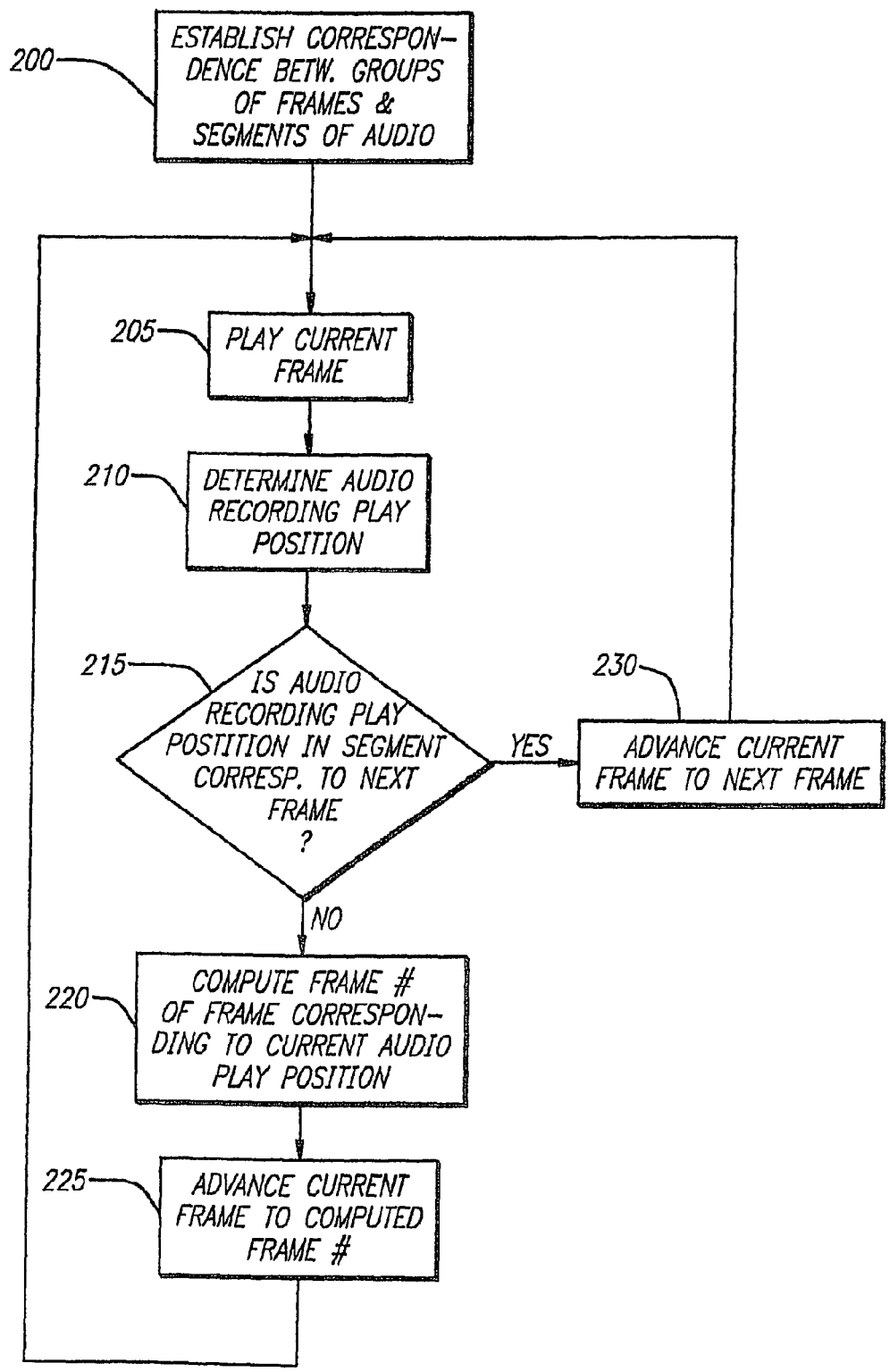
FIG. 2 is a flowchart of the synchronization code.

In a variant form of this synchronization algorithm (shown in FIG. 2), the frames of the animation are arranged into groups of contiguous frames. A correspondence is established between each such group of frames and a particular segment of the audio recording (box 200 in FIG. 2). At the end of each frame of the animation, the audio play position is determined (box 210). A test is done to determine whether the audio play position is within the segment of the recording that corresponds to the group of frames to which the next sequential frame belongs (box 215). If the audio play position is within that segment, the playback of the animation proceeds with that next frame (box 230). If the audio play position is not within that segment, then the playback of the animation is advanced to the frame corresponding to where the audio is (boxes 220 and 225).

4. Unique Identifiers for Audio CDs

A further aspect is the ability, by making use of the command plug-in, to provide a technique for establishing a unique identifier for an audio CD which is located in the user's CD player. The unique identifier may be based on the number and lengths of the tracks (measured in blocks, i.e., {fraction (1/175)}th of a second), so that the identifier would be a concatenation of these lengths. In practice, however, it is desirable to have a somewhat shorter identifier, so the unique identifier is preferably the concatenation of the track lengths expressed in a fairly coarse unit, such as ¼th of a second.

Appendix A contains source code, written in C for a fuzzy comparison algorithm suitable for determining whether two audio CDs are exactly or approximately the same. The fuzzy comparison algorithm proceeds as follows. For each of the two audio CDs to be compared, one determines the lengths of all the tracks in the recordings in milliseconds. One then shifts all track lengths to the right by eight bits, in effect performing a truncating division by $2.^{8}=256$. One then goes through both of the recordings track by track, accumulating as one proceeds two numbers, the match total and the match error. These numbers are both initialized to zero at the start of the comparison. For each of the tracks, one increments the match total by the shifted length of that track in the first CD to be compared, and one increments the match error by the absolute value of the difference between the shifted lengths of the track in the two CDs. When one gets to the last track in the CD with the fewer number of tracks, one continues with the tracks in the other CD, incrementing both the match total and the match error by the shifted lengths of those tracks. Following these steps of going through the tracks, the algorithm then divides the match error by the match number, subtracts the resulting quotient from 1, and converts the difference to a percentage which is indicative of how well the two CDs match.

Appendix B contains source code, written in C, for a comparison algorithm suitable for determining whether two audio CDs are exactly the same. The algorithm generates from the number of tracks, the track lengths, and the start and end times of the tracks an 8-byte value. The high order 4 bytes are obtained by summing the start and end times of all tracks, expressed in milliseconds. The low order 4 bytes are obtained by summing the lengths of all tracks expressed in milliseconds, shifting the sum left ten bits, and adding the number of tracks.

A unique identifier for a musical recording may be employed as a database key. A site may maintain a database of information about CDs, for example information about all CDs issued by the particular record company can be maintained on that record company's site. There are various alternative ways for users to navigate this information. For example, they could use a Web page containing many hyperlinks as a table of contents, or they could use a conventional search engine. A third way of searching which is enabled by the unique identifier is for there to be Web page which invites the user to place in the computer's CD drive the CD about which he or she is seeking information. Upon detection of the presence of the CD in the drive, a script in the Web page computes the unique identifier corresponding to the CD and sends it to the server. The server then displays information about the CD retrieved from a database on the basis of that unique identifier. This information may include a Web address (URL) that is related to the audio CD (e.g., that of the artists' home page), simple data such as the names of the songs, and also complementary entertainment, including potentially photographs (e.g., of the band), artwork, animations, and video clips. It is also possible to arrange things so that, when the user inserts an audio CD into the computer, (i) the Web browser is launched if not already running, (ii) the browser computes the CD's unique identifier and from that unique identifier derives, aURL, and (iii) the browser does an HTTP get transaction on that URL.

An alternative application of unique identifiers for musical recordings is to employ an audio CD as a key for entering into a premium area of the Web. There are presently premium areas of the Web to which people are admitted by subscription. A simple form of admission based on the unique identifier is to require, before accessing a particular area of the Web, that the user place in his or her CD drive a particular CD, or a CD published by a particular company or containing the music of a particular band or artist. This is readily accomplished by a script which invokes the functions provided by the command plug-in and computes a unique identifier.

5. Chat Rooms Connected with Musical Recordings

A third aspect is the connection of chat rooms with musical recordings. The goal is to provide all participants in a chat room with the same music at approximately the same time.

The prevailing network protocol for chat services is Internet Relay Chat (IRC), described J. Oikarinen & D. Reed, Internet Relay Chat Protocol (Internet Request for Comments No. 1459, 1993). In this protocol, when one becomes a client of a chat server, one sends the name of a chat room. The chat server receives messages from all of its clients and relays the messages sent in by one client to all the other clients connected in the same room as that client. The messages which a client sends are typically typed in by the user who is running the client, and the messages which a client receives are typically displayed for the user who is running the client to read.

Figure 3:
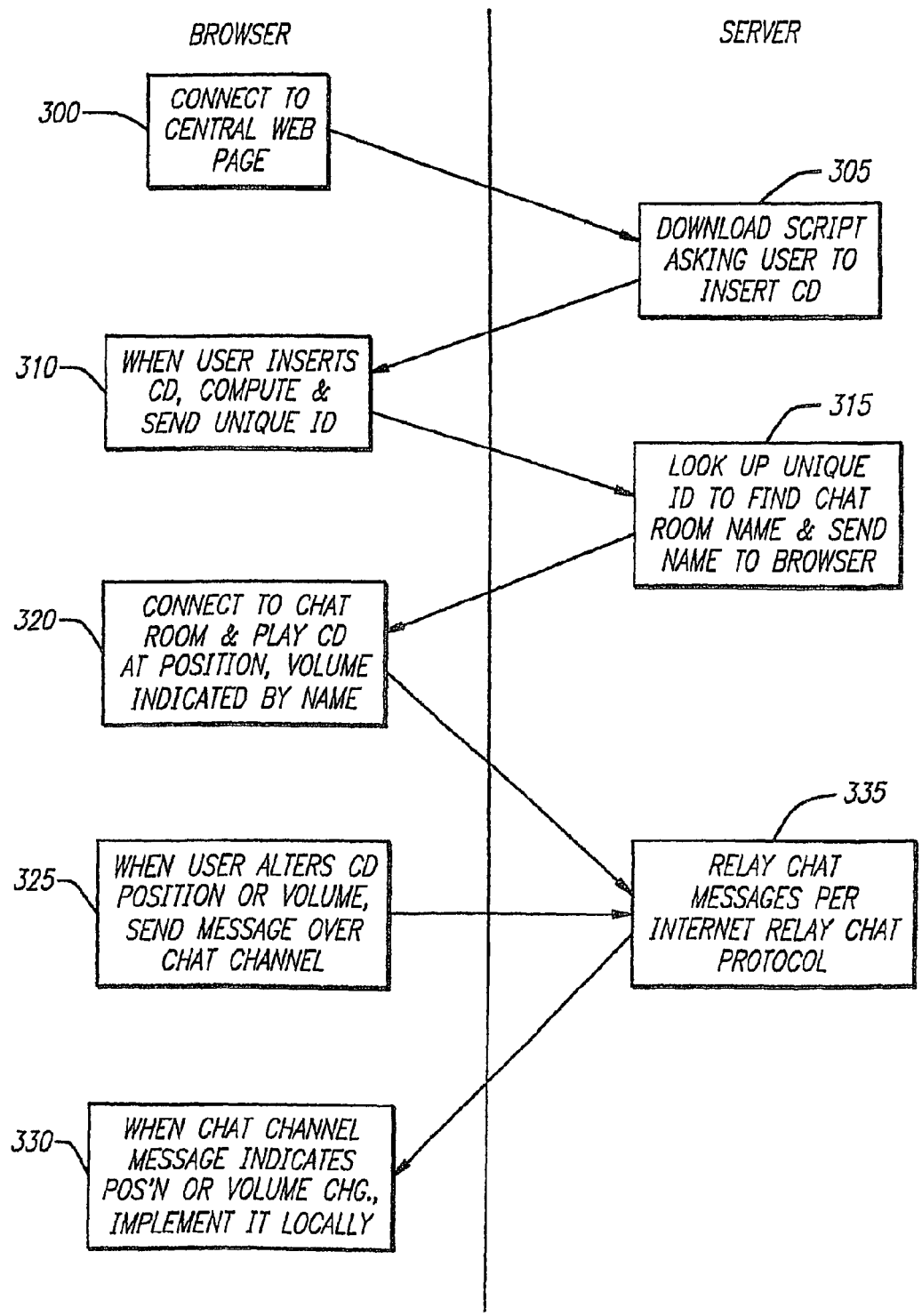
FIG. 3 is a flowchart of the sequence of operations for connection to a chat room focused on a musical recording.

In a preferred embodiment, a chat client is customized by a plug-in, which we will call the chat plug-in. The chat client is started up by a browser as follows (see FIG. 3). The user connects via the browser to a central Web page (box 300) which, upon being downloaded, asks that the user insert a CD into his or her player (box 305). A unique identifier of the CD is computed and communicated back to the server by using the control plug-in described above under the command of a script in the central Web page (box 310). The server then employs the unique identifier to determine whether it has a chat room focused on the CD (box 315). This step may be carried out by looking the unique identifier up in a database using techniques well known in the art. There exists a vast literature on connecting Web pages to databases, e.g., December & Ginsburg, supra, chapter 21. If a chat room focused on the CD exists or can be created, the server responds with the name of that chat room, and the browser starts up a chat client on the user's computer as a client of that chat room (box 320).

The chat room's name is set by the server to contain information about the track which the CD is playing in the other chat room clients' machines and the time at which the track started to play, as well as about the volume at which the CD is playing. The chat client plug-in employs that information to direct the control plug-in to set the CD in the user's computer to play in such a manner that it is approximately synchronized to the CD which is playing in the other chat room clients' machines (box 320).

Each user in the chat room is able to control the CD which is playing in his or her machine. Control actions result in the chat plug-in sending messages to the chat server which describe the control action being taken (box 325). For example, such messages may indicate a change in the position of the CD, a change in the volume, or the ejection of the CD to replace it with another. The chat plug-ins running on the other users' machines, upon seeing a message of this kind, replicate the action (as far as possible) on the other users' machines by using the control plug-in described above (box 330).

In a further aspect, a chat room focused on a particular musical recording might allow for a voting procedure to select particular tracks. A simple voting procedure would be for each chat plug-in to act upon a change message of the kind described in the preceding paragraph only when it sees two identical consecutive change messages. This would mean that in order to change the track which is being played, it would be necessary for two users to change to that track. The number two may be replaced by a higher number.

In a further aspect the messages delivered to the users of a chat can be driven from a text file rather than manual typing. This would allow a prerecorded experience to be played back for a group of chat users. Such a technique may be used to create a pre-recorded, narrated tour of an audio CD.

An important advantage of the preferred embodiment as described above is that it may be used with any chat server software which supports the minimal functionality required by Internet Relay Chat or by a protocol providing similar minimum chat service. The additional software required is located in the chat client plug-n and in the central Web page, with its connection to a database of CD information.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method comprising:
   identifying a unique identifier of a musical recording being played on a device;
   communicating the unique identifier of the musical recording via a network to a remote computer that maintains information about musical recordings, the information comprising at least visual content;
   receiving from the server a plurality of units of visual content related to the musical recording based on the unique identifier;
   identifying a current playback time within a track of the musical recording;
   identifying a unit of visual content to be displayed with the playback of the musical recording, the unit of visual content being identified based on the track and the current playback time and being provided by the remote computer; and
   displaying the unit of visual content synchronously with the musical recording being played on the device.

2. The method of claim 1, comprising displaying each unit of visual content upon receipt of the unit of visual content from the remote computer.

3. The method of claim 1, further comprising downloading and storing units of visual content from the remote computer via the network prior to displaying the units visual content.

4. The method of claim 1, wherein the musical recording comprises a plurality of segments, the method further comprising:
   identifying a segment corresponding to the track and the current time; and
   identifying the unit of visual content corresponding to the segment.

5. The method of claim 4, wherein the current playback time identifies an audio recording play position, the method further comprising:
   identifying when the audio play position is in a segment corresponding to a next unit of visual content; and
   displaying the next unit of visual content.

6. The method of claim 4, comprising displaying the unit of visual content for the duration of the corresponding segment.

7. The method of claim 1, wherein the unit of visual content is provided in a frame corresponding to the track and the current time.

8. The method of claim 7, wherein the musical recording comprises segments of audio and the identifying of the unit of visual content includes establishing correspondence between the frames and the segments of audio.

9. The method of claim 1, wherein the unit of visual content is text.

10. The method of claim 9, wherein the text is provided by a link to a URL.

11. The method of claim 1, wherein the unit of visual content is video content.

12. The method of claim 1, wherein the unit of visual content is information associated with the musical recording.

13. The method of claim 1, wherein the unit of visual content comprises names of songs, photographs, artwork, animations, and/or video clips.

14. The method of claim 1, wherein the unit of visual content is interactive content.

15. The method of claim 1, wherein the unit of visual content is provided using a markup language.

16. The method of claim 15, wherein the musical recording comprises a plurality of segments, the method further comprising:
   identifying a segment corresponding to the track and the current time; and
   identifying the unit of visual content corresponding to the segment.

17. The method of claim 15, wherein the unit of visual content is provided in a web page.

18. The method of claim 1, wherein the unit of visual content is provided via a hyperlink.

19. The method of claim 18, wherein the hyperlink is a Uniform Resource Locator (URL).

20. The method of claim 1, wherein the unit of visual content is provided using a series of frames, the method comprising accessing each frame based on the track and the current time.

21. The method of claim 20, wherein the unit of visual content is provided using a markup language.

22. The method of claim 1, wherein the identifying of the track comprises obtaining a unique identifier of the musical recording.

23. The method of claim 1, wherein identifying the track comprises computing a unique identifier and receiving a URL associated with the unique identifier.

24. The method of claim 1, comprising displaying units of visual content which appear and disappear at particular frames within a time line.

25. A device comprising:
   memory to store instructions; and
   at least one processor to execute the instructions which cause the device to:
      identify a unique identifier of a musical recording being played on the device;
      communicate the unique identifier of the musical recording via a network to a remote computer that maintains information about musical recordings, the information comprising at least visual content;
      receive from the server units of visual content related to the musical recording based on the unique identifier;
      identify a current playback time within a track of the musical recording;
      identify a unit of visual content to be displayed with the playback of the musical recording, the unit of visual content being identified based on the track and the current playback time and being provided by the remote computer; and
      display the unit of visual content synchronously with the musical recording being played on the device.

26. The device of claim 25, wherein each unit of visual content is displayed upon receipt of the unit of visual content from the remote computer.

27. The device of claim 25, wherein units of visual content are downloaded from the remote computer via the network and stored on the device prior to displaying the units visual content.

28. The device of claim 25, wherein:
   the musical recording comprises a plurality of segments;
   a segment corresponding to the track and the current time is identified; and
   the unit of visual content corresponding to the segment is identified.

29. The device of claim 28, wherein:
   the current playback time identifies an audio recording play position;
   a determination is made when the audio play position is in a segment corresponding to a next unit of visual content; and
   the next unit of visual content is displayed.

30. The device of claim 25, wherein the unit of visual content is text.

31. The method of claim 1, wherein the visual content is thematically linked to the musical recording.

* * * * *